United States Patent
Kazmi et al.

(10) Patent No.: US 9,699,743 B2
(45) Date of Patent: *Jul. 4, 2017

(54) METHODS AND APPARATUS FOR ADJUSTING MAXIMUM OUTPUT POWER LEVEL

(71) Applicant: Telefonaktiebolaget LM Ericsson (publ), Stockholm (SE)

(72) Inventors: Muhammad Kazmi, Bromma (SE); Farshid Ghasemzadeh, Sollentuna (SE); Jinhua Liu, Beijing (CN); Qingyu Miao, Beijing (CN); Erika Tejedor, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/163,036

(22) Filed: May 24, 2016

(65) Prior Publication Data
US 2016/0270008 A1 Sep. 15, 2016

Related U.S. Application Data

(63) Continuation of application No. 14/384,431, filed as application No. PCT/SE2013/050287 on Mar. 15, 2013, now Pat. No. 9,363,765.

(Continued)

(51) Int. Cl.
*H04W 52/00* (2009.01)
*H04W 52/36* (2009.01)
(Continued)

(52) U.S. Cl.
CPC ......... *H04W 52/367* (2013.01); *H04W 52/18* (2013.01); *H04W 52/281* (2013.01);
(Continued)

(58) Field of Classification Search
CPC .......................... H04W 52/367; H04W 52/143
(Continued)

(56) References Cited

U.S. PATENT DOCUMENTS

| 5,926,133 A * | 7/1999 | Green, Jr. ............... G01S 1/026 342/363 |
| 5,930,684 A * | 7/1999 | Keskitalo ............ H04W 52/281 455/13.4 |
| 2013/0178178 A1* | 7/2013 | Lockerbie ........... H04W 52/367 455/127.1 |

FOREIGN PATENT DOCUMENTS

WO 2008067471 A1 6/2008

OTHER PUBLICATIONS

3rd Generation Partership Project, "3rd Generation Partnership Project; Technical Specification Group Radio Access Network; User Equipment (UE) radio transmission and reception (FDD) (Release 10)", Technical Specification, 3GPP TS 25.101 V10.0.1, Jan. 1, 2011, pp. 1-265, 3GPP, France.

(Continued)

*Primary Examiner* — John J Lee
(74) *Attorney, Agent, or Firm* — Coats and Bennett, PLLC

(57) ABSTRACT

The present invention relates to a method implemented by a wireless device in a wireless communication system, for adjusting a maximum output power level of the wireless device. The method comprises obtaining an indication indicating a current level of criticality in the system in which a network node serving the wireless device is operating, and adjusting the maximum output power level based on the current level of criticality indicated by the obtained indication.

26 Claims, 9 Drawing Sheets

Related U.S. Application Data

(60) Provisional application No. 61/612,790, filed on Mar. 19, 2012.

(51) Int. Cl.
*H04W 52/28* (2009.01)
*H04W 52/18* (2009.01)
*H04W 52/34* (2009.01)
*H04W 4/22* (2009.01)
*H04W 52/14* (2009.01)
*H04W 52/24* (2009.01)
*H04W 76/00* (2009.01)

(52) U.S. Cl.
CPC .............. *H04W 52/34* (2013.01); *H04W 4/22* (2013.01); *H04W 52/146* (2013.01); *H04W 52/241* (2013.01); *H04W 52/242* (2013.01); *H04W 52/243* (2013.01); *H04W 76/007* (2013.01)

(58) Field of Classification Search
USPC ...................... 455/522, 69, 127.1, 126, 67.11
See application file for complete search history.

(56) References Cited

OTHER PUBLICATIONS

3rd Generation Partership Project, 3rd Generation Partnership Project; Technical Specification Group Radio Access Network; Evolved Universal Terrestrial Radio Access (E-UTRA); User Equipment (UE) radio transmission and reception (Release 10), Technical Specification, 3GPP TS 36.101 V10.1.1, Jan. 1, 2011, pp. 1-199, 3GPP, France.

Motorola Solutions, "Public Safety Broadband High Power UE for Band 14 for Region 2—Feature WID", 3GPP TSG-RAN Meeting #55, Xiamen, China, Feb. 28, 2012, pp. 1-4, RP-120362, 3GPP.

Motorola Solutions, "Public Safety Broadband High Power UE for Band 14 for Region 2—Core Wid", 3GPP TSG-RAN Meeting #55, Xiamen, China, Feb. 28, 2012, pp. 1-4, RP-120362, 3GPP.

NII, "CR E850 LB-Core spectrum band definition additions to TS 36.101", Change Request, 3GPP TSG-RAN WG4 Meeting #62, Dresden, Germany, Feb. 6, 2012, pp. 1-32, R4-120799, 3GPP.

CT1, "LS on SAE Interworking with Pre-REL8 system from CT4", 3GPP TSG CT WG1 Meeting #52, Jeju Island, Korea, Apr. 7, 2008, p. 1, C1-081383 , 3GPP.

* cited by examiner

700 Wireless device

701 TX Processing Circuits

703 Configuration Selector

704 Configuration Application circuit

705 Memory

702 Interface(s)

Fig. 7a

750 Network node

751 Processing Circuits

753 Signalling circuit

754 Controller

755 Memory

752 Interface(s)

Fig. 7b

METHODS AND APPARATUS FOR ADJUSTING MAXIMUM OUTPUT POWER LEVEL

RELATED APPLICATIONS

This application is a continuation of U.S. patent application Ser. No. 14/384,431, filed Sep. 11, 2014, which is the National Stage of International Application No. PCT/SE2013/050287, filed Mar. 15, 2013, which claims the benefit of U.S. Provisional Application 61/612,790, filed Mar. 19, 2012, the disclosures of each of which are incorporated herein by reference in their entirety.

TECHNICAL FIELD

The disclosure relates to a network node and a wireless device and to corresponding methods for adjustment of maximum output power level of the wireless device based on a level of criticality in the system.

BACKGROUND

3GPP Long Term Evolution (LTE) is the fourth-generation mobile communication technologies standard developed within the $3^{rd}$ Generation Partnership Project (3GPP) to improve the Universal Mobile Telecommunication System (UMTS) standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an E-UTRAN, a User Equipment (UE) is wirelessly connected to a Radio Base Station (RBS) commonly referred to as a NodeB in UMTS, and as an evolved NodeB (eNodeB) in LTE. An RBS is a general term for a radio network node capable of transmitting radio signals to a UE and receiving signals transmitted by a UE. In UMTS, a Radio Network Controller (RNC) controls the NodeB, and is, among other things, in charge of management of radio resources in cells for which the RNC is responsible. The RNC is also connected to the Core Network (CN). In LTE, the eNodeB manages the radio resources in the cells, and is directly connected to the CN. The eNodeB is also connected to neighboring eNodeBs via an X2 interface.

In LTE a new UE power class (probably 31 dBm) for public safety operation is being standardized. Similarly Uplink Multiple Input Multiple Output (UL MIMO) capabilities in the UE are also being standardized. These capabilities can be exploited to improve the data rate and uplink coverage.

Duplex Modes of Operations

A frequency band or an operating frequency band supports a specific duplex mode of operation. The possible duplex modes are: frequency division duplex (FDD), time division duplex (TDD) and half duplex FDD (HD-FDD).

In FDD mode of operation, which is used in UTRAN FDD and E-UTRAN FDD, the uplink and downlink transmission take place on different carrier frequency channels. Therefore, in FDD mode both uplink and downlink transmission can occur simultaneously in time. On the other hand in TDD mode, which is used in UTRAN TDD and E-UTRAN TDD, the uplink and downlink transmission take place on the same carrier frequency channel but in different time slots or sub-frames. HD-FDD, which is used in Global System for Mobile communications (GSM), can be regarded as a hybrid scheme where the uplink and downlink are transmitted on different carrier frequencies and are also transmitted on different time slots. This means that uplink and downlink transmission don't occur simultaneously in time.

UE Requirements

The UE has to meet a certain set of requirements, which can be classified as transmitter requirements and receiver requirements. The objective of the requirements is to ensure certain performance level on the own UE as well as to not degrade the performance of surrounding UEs or radio nodes such as base stations (BS). Certain radio related requirements are in particular required to be met due to regulation in a country or a region. The requirements are therefore typically pre-defined in the standard.

Examples of transmitter requirements are output power or out of band emission requirements. Out of band emission requirements are more thoroughly described hereinafter. Examples of receiver requirements are receiver sensitivity, Adjacent Channel Selectivity (ACS) or blocking requirements.

Similar requirements are also specified for radio nodes e.g. base stations, relays, and repeaters. However the performance figures for the UE and the radio node are generally different.

Factors Limiting UE Maximum Output Power

The UE maximum output power is limited due to the following major factors:

Radio emissions, e.g. out of band emission and RF exposure

Terminal battery life

Heat dissipation

These concepts are described below:

Radio Emissions

Although a wireless device typically operates in a well defined portion of a frequency band, emissions outside its channel bandwidth and also outside its operating frequency band are unavoidable. These emissions outside the bandwidth or frequency band are often termed as out of band emissions or unwanted emissions. The emissions both inside and outside the bandwidth and/or frequency band of operation are also exposed to human body.

These two concepts, i.e. unwanted emissions and RF exposure to human, and their associated signaling aspects are described below.

Unwanted Emissions

The UEs as well as base stations have to fulfill a specified set of unwanted emission requirements, which consist of out of band (OOB) emissions and spurious emissions. The objective of OOB emission requirements is to limit the emissions from the transmitters (UE or BS) on frequencies adjacent to their respective channel bandwidths due to for example non-linearity and component imperfections. In fact, all wireless communication standards, such as GSM, UTRAN, E-UTRAN, and Wireless Local Area Network (WLAN), clearly specify the OOB emission requirements to limit or at least minimize the unwanted emissions. Spurious emissions requirements are defined in order to limit the emissions out of the operating band where the UE or BS is operating due to for example harmonic emissions and intermodulation products. The unwanted emission requirements are primarily approved and set by the national and international regulatory bodies. The major OOB and spurious emission requirements are typically specified by the standard bodies and eventually enforced by the regulators in different countries and regions for both UE and BS.

The OOB emissions comprise:

Adjacent Channel Leakage Ratio (ACLR)

Spectrum Emission Mask (SEM)

The specific definition and the specified level of OOB and spurious emissions can vary from one system to another. Typically these requirements ensure that the emission levels outside the transmitter channel bandwidth or operating band remain several tens of dB below the transmitted signal. Emission levels tend to decay dramatically further away from an operating band but they are not completely eliminated at least in the adjacent carrier frequencies.

Concept of Maximum Power Reduction (MPR)

As stated above that the UE and BS have to meet the OOB and spurious emission requirements irrespective of their transmission power level. For the UE the conservation of its battery power is very critical. This requires that the UE has an efficient power amplifier (PA). The PA is therefore typically designed for certain typical operating points or configurations or set of parameter settings e.g. modulation type, number of active physical channels such as resource blocks in E-UTRA or number of Code Division Multiple Access (CDMA) channelization codes code or spreading factor in UTRA. But in practice the UE may operate using any combination of modulation, and physical channels. Therefore, in some uplink transmission scenarios the UE power amplifier may not be able to operate in the linear zone, thereby causing unwanted emissions due to harmonics or other non-linear characteristics. To ensure that UE fulfills OOB/spurious requirements for all allowed uplink transmission configurations the UE is allowed to reduce its maximum uplink transmission power in some scenarios. This is called MPR or UE power back-off in some literature. For instance a UE with maximum transmit power of 24 dBm power class may reduce its maximum power from 24 dBm to 23 or 22 dBm depending upon the configuration. It should be noted that the term maximum transmit power may interchangeably be referred to as maximum transmission power or maximum output power. All these terms have the same meaning.

The BS may also have to perform MPR. However, this is not standardized. Secondly the BS can afford to have a PA with larger operating range since its efficiency is less critical compared to that of UE. The MPR values for different configurations are generally well specified in the standard. The UE uses these values to apply MPR when the conditions for the corresponding configurations are fulfilled. These MPR values are regarded as static in a sense that they are independent of resource block allocation and other deployment aspects.

Concept of Additional MPR, A-MPR

In E-UTRA an Additional MPR (A-MPR) for the UE transmitter has also been specified in addition to the normal MPR. The difference is that the former is not fully static. Instead the A-MPR can vary between different cells, operating frequency bands and more specifically between cells deployed in different location areas or regions. In particular the A-MPR may be applied by the UE in order to meet the additional emission requirements imposed by the regional regulatory organization. A-MPR is an optional feature, which is used by the network when needed depending upon the co-existence scenario.

The A-MPR defines the UE MPR, on top of the normal MPR, needed to fulfill certain emission requirements by accounting for factors such as: bandwidth, frequency band or resource block allocation.

In the following, signaling of regulatory requirements and A-MPR to the UE is described. The regulatory requirements may vary from one region to another and from one network to another. The presence of additional regulatory requirements is signalled via a cell specific signalling known as network signalling (NS). Associated with the NS signalling there is a set of A-MPR values which may depend on for example resource block allocation, channel bandwidth, frequency band, or non-cellular systems (e.g. public safety wireless network).

To meet the regulatory emission requirements the A-MPR required could vary from one part of the network to another. This is due to the factors such as the variable bandwidth, varying number of resource block allocation, and different bands in different parts of the networks. Even if the deployment scenario in terms of e.g. bands used, and bandwidth size is homogeneous in a large coverage area, there will always be border regions between these coverage areas. Therefore A-MPR is a cell specific value.

Due to the above reasons the NS value is signaled to the UE via system information in a UE specific channel or in a broadcast message. This allows the UE to acquire this information when it camps on to a cell. The acquired NS value which is associated with a cell is then used by the UE to map to certain A-MPR and reduce its maximum output power whenever it transmits in the uplink.

RF Exposure to Human

Another important factor is the human exposure to Radio Frequency (RF) Electromagnetic Fields (EMF) which are transmitted by the UE. The most important guidelines on RF exposure to human are from the International Commission on Non-Ionizing Radiation Protection (ICNIRP, 1998) and from the Institute of Electrical and Electronics Engineers (IEEE, 1999). The limits in these recommendations are similar and they have been used as the basis for national standards and regulations in many countries. The ICNIRP guidelines, which are the most widely used recommendations, have been endorsed by the World Health Organization.

These RF exposure guidelines are science-based and the prescribed limits have been set with substantial safety margins. They provide protection from all established health effects from short-term and long-term exposure to RF fields, and the safety of children and other segments of the population have been taken into account.

Specific Absorption Rate (SAR) is introduced to measure impact on the human body from the exposure of RF EMF transmitted by the UE. SAR is a measure of the maximum energy absorbed by a unit of mass of exposed tissue of a person using a mobile phone, over a given time or more simply the power absorbed per unit mass. Advised by ICNIRP, the communication administration departments of different countries issued the SAR limits. For instance, the Federal Communications Commission (FCC) has determined that the SAR limit is 1.6 W/kg for cell phone. The SAR limit in Europe and in most of countries is 2 W/kg.

Power Reduction to Limit RF Exposure

The UE should comply with the SAR requirements or any type of requirements for limiting the RF exposure to human which are specified by the regulator in an individual country, region, province or state. In order to meet these requirements the UE may also have to reduce its maximum output power. Hence the UE maximum output power is limited by the SAR limit.

In prior art a generic term called power management is also interchangeably used for controlling emissions to limit the SAR. The power management MPR (P-MPR) is the amount of UE output power reduction needed to meet the RF exposure requirements.

The following describes the signaling of RF Exposure Requirements to the UE. In prior art one or more parameters associated with the MPR to be applied by the UE to meet the SAR or any type of RF exposure requirements are signaled to the UE. This means the P-MPR may also be signaled to the UE. This is due to the fact that SAR or RF exposure requirements may vary from one region to another. Hence the amount of the MPR required by the UE to meet the requirements may vary from one cell to another.

Terminal Battery Life

If the maximum output of the UE transmitter is high then the battery life will be affected. Therefore it is desirable that the UE operates at higher output power only when necessary.

Heat Dissipation

Another important factor in limiting the UE output power is the impact on the heat dissipation. When the UE operates at higher output power the temperature of the components and circuitry typically increases. The increase in the temperature may lower the accuracy with which the UE can perform various physical layer operations e.g. power control, emission control, and radio measurements. Hence it is not desirable that the UE often operates at a higher output power than necessary.

Public Safety Operation

Public safety wireless communication system relates to the prevention of and protection from dangerous and hazardous events, e.g. a natural or man-made disaster such as tsunami, earthquake, flood, fire, or an act of terror.

The existing Public safety wireless system is typically a narrowband system, from 6.25 to 25 kHz bandwidth, depending on the part of the allocated spectrum. However, the use of a wideband or broadband technology for Public Safety is now getting a lot of interest. In wideband or wide bandwidth technology larger bandwidth such as 5 MHz or 10 MHz may be used. The wideband technology will enhance the type and quality of communication. For example it will allow the public safety personnel to send emergency signal and respond to them in a faster and more efficient way than today. It will also provide the public with new ways of calling for help and receiving help, e.g. receiving a video with instructions regarding what to do in the wake of disaster or in an anticipation of an impending disaster.

Examples of Higher UE Output Power Class

In High Speed Packet Access (HSPA) the most commonly used UE power class is 24 dBm i.e. UE maximum output power, also known as nominal maximum output power, is 24 dBm. In LTE as of now the UE power class is 23 dBm. However there are features which may require UE to support higher output power class. A few examples are given below.

High UE Power Class for Public Safety

Recently a work item to specify UE requirements for E-UTRA UE Power Class 1 (+31 dBm maximum output power or more) has been approved. More specifically this higher power class is being specified to operate in the Public Safety broadband (PSBB) deployment in band 14 (700 MHz) in US. The PSBB will use LTE technology. This means their maximum output power is well above the normal maximum output power level used for mobile/cellular communication, which is e.g. 23 dBm in LTE as described above. The normal maximum output power herein refers to the level which is within the SAR limit. As described earlier this SAR limit ensures protection from health effects due to exposure to RF fields.

The Unused UE Potential Power in Case of Uplink Multiple Antenna Transmission

Taking HSPA evolution as an example, the Uplink Transmit Diversity (ULTD) is being specified in 3GPP for HSPA. FIG. 1a shows the UE structure of Open Loop Beam-Forming (OLBF). A typical OLBF implementation comprises two transmit antennas, 15a, 15b, using two half PAs, 11a, 11b, (e.g. each of 21 dBm). In such implementation, the Random Access Channel (RACH) performance may not be guaranteed in case the beamforming is also used for the RACH transmission, since no feedback information is available to generate an accurate RACH beam. Alternatively the use of a single PA may cause loss in RACH coverage especially when UE is located in a cell border region. In order to ensure good coverage of the RACH access, an alternative implementation was proposed where one of the two PAs, 11a, 11b, could be full-power PA. The full power PA could for instance be used for RACH without beam-forming to ensure the coverage equivalent to that of the legacy RACH. The full-power PA can output up to the maximum allowed output power of the UE i.e. the nominal maximum output power (e.g. 24 dBm). This means the OLBF capable UE with this alternative PA implementation can output a higher power than the maximum allowed transmit power when two PAs output the maximum power at the same time. Hence the UE potential power cannot be fully utilized due to the limitation of maximum allowed UE output power. In other words the UE cannot transmit up to its actual output power capability. In case both PA1, 11a, and PA2, 11b, are full-power amplifiers, 3 dB of the UE total potential power remains unused. In case PA1 is a full-power PA and PA2 is a half-power PA, 1.76 dB of the UE total potential power remains unused.

One example of a UE architecture supporting Closed Loop Transmit Diversity (CLTD), i.e. baseband processing and radio frequency (RF) front end, is illustrated in FIG. 1b. The UL MIMO is another potential natural step in case CLTD is used since there are no major differences in their architectures. In order to ensure legacy RACH coverage, the UE capable of CLTD and UL MIMO may also employ one or more full power PA. The UE with such implementation cannot operate with its full output power capability leading to power wastage.

Carrier Aggregation

To enhance peak-rates within a technology, multi-carrier or carrier aggregation solutions are known. For example, it is possible to use multiple 5 MHz carriers in HSPA to enhance the peak-rate within the HSPA network. Similarly in LTE for example multiple 20 MHz carriers can be aggregated in the uplink and/or in the downlink. Each carrier in multi-carrier or carrier aggregation system is generally termed as a component carrier (CC) or sometimes is also referred to as a cell. In simple words the CC means an individual carrier in a multi-carrier system. The term carrier aggregation (CA) is also called "multi-carrier system", "multi-cell operation", "multi-carrier operation", "multi-carrier" transmission and/or reception. This means the CA is used for transmission of signaling and data in the uplink and downlink directions. One of the CCs is the primary carrier or anchor carrier and the remaining ones are called secondary or supplementary carriers. Generally the primary or anchor CC carries the essential UE specific signaling. The primary CC exists in both uplink and downlink direction. The network may assign different primary carriers to different UEs operating in the same sector or cell.

The CCs belonging to the CA may belong to the same frequency band, also known as intra-band CA, or to different frequency bands, inter-band CA, or any combination thereof, such as e.g. 2 CCs in band A and 1 CC in band B. The inter-band CA comprising carriers distributed over two bands is also called dual-band-dual-carrier-High Speed Downlink Packet Access (HSDPA) in HSPA or inter-band CA in LTE. Furthermore the CCs in intra-band CA may be adjacent or non-adjacent in frequency domain, the latter also known as intra-band non-adjacent CA. A hybrid CA comprising of intra-band adjacent, intra-band non-adjacent and inter-band is also possible. Using CA between carriers of different technologies is also referred to as "multi-Radio Access Technology (RAT) carrier aggregation" or "multi-RAT-multi-carrier system" or simply "inter-RAT carrier aggregation". For example, the carriers from WCDMA and LTE may be aggregated. Another example is the aggregation of LTE and CDMA2000 carriers. For the sake of clarity the carrier aggregation within the same technology as described can be regarded as 'intra-RAT' or simply 'single RAT' carrier aggregation.

The FDD or HD-FDD capable UE supporting carrier aggregation requires RF devices like diplexer or quadplexer, which result in UE maximum output power reduction. The power reduction affects loss of uplink coverage even when such a UE operates in legacy mode, i.e. in single carrier operation.

RACH Coverage

Physical random access channel (PRACH) is used by the UE during a random access procedure. In HSPA the PRACH is used by the UE for accessing the cell during initial access e.g. in idle mode, during RRC re-establishment, or RRC connection release with redirection. In LTE the PRACH is used by the UE for accessing the cell during initial access, e.g. in idle mode, during RRC re-establishment, or RRC connection release with redirection, but also during handover when accessing a neighbor cell.

The UE sends a selected predetermined sequence over PRACH when it wants to setup a radio connection or perform a cell change, e.g. in LTE. The network should detect the PRACH sequence and send a response to the UE to continue the radio link establishment. In order to reduce the delay in radio link setup, the time between the UE sending the PRACH sequence and the network sending the PRACH response is very short, e.g., less than 2 ms for WCDMA-HSPA. The UE typically transmits the PRACH with an output power level which is determined based on an open loop power control principle. This means that the UE first estimate the uplink path loss and determine the power to achieve certain target signal level at the base station. The target signal level or associated parameters are signaled to the UE by the relevant network node.

Advanced Receivers

A well known example of an advanced receiver is a Minimum Mean Square Error Interference Rejection Combining (MMSE-IRC). Examples of more sophisticated advanced receiver are Mean Square Error-turbo Interference Cancellation, and post-decoding successive interference cancellation receiver. They are capable of performing non-linear subtractive-type interference cancellation. This can be used to further enhance system performance.

The terms interference mitigation receiver, interference cancellation receiver, interference rejection receiver, interference aware receiver, interference avoidance receiver etc are interchangeably used but they all belong to a category of an advanced receiver or an enhanced receiver. All these different types of advanced receiver improve performance by fully or partly eliminating the interference arising from at least one interfering source.

The advanced receiver or an enhanced receiver can be used in the UE or in a radio network node, e.g. BS. The base station may use the advanced receiver for receiving different types of channels including PRACH.

Problems with Existing Solutions

There exist UEs with higher output power class developed for specific operation and scenarios e.g. for public safety. That is their nominal maximum output power is higher than the normal level used for mobile communication. However in prior art there are no mechanisms or procedures for how to use such UEs for another set of scenarios, such as for normal cellular operation, while meeting the normal requirements i.e. requirements related to cellular operation. Hence such a higher power class UE has to meet the same level of requirements, i.e. suitable for a particular type of network operation, regardless of the criticality of the network operation. This may not be optimal from a network operation perspective in some scenarios and may also prevent mobility between different systems, e.g. between public safety network and normal mobile communication networks. An operator may e.g. not allow a UE with higher maximum output power to operate as a cellular UE.

On the other hand the uplink coverage in many scenarios is becoming a severe bottleneck. For example the UE power back-off is introduced due to losses when signal passes through RF components like diplexer or quadplexer. These components are particularly used for multi-band and multi-carrier transmission and reception, multi-antenna transmission, and combinations thereof. The UE power back-off in such implementation is also required when the UE operates in legacy mode e.g. single band operation or single antenna operation. This means that a high-end UE, such as a UE adapted for multi-carrier transmission, may have worse coverage and performance when operating in legacy mode compared to a low-end UE e.g. adapted for single carrier transmission. This can be annoying for the end user and for the operators. Furthermore in certain critical scenarios and situations it is important that the UE is able to maintain coverage and connection with the network.

SUMMARY

It is therefore an object to address at least some of the problems addressed above, and to allow for maximum output power adjustment in the above described problem scenarios to avoid the drawbacks. This object and others are achieved by the methods, the wireless device and the network node according to the independent claims, and by the embodiments according to the dependent claims.

In accordance with a first aspect, a method implemented by a wireless device in a wireless communication system, for adjusting a maximum output power level of the wireless device is provided. The method comprises obtaining an indication indicating a current level of criticality in the system in which a network node serving the wireless device is operating, and adjusting the maximum output power level based on the current level of criticality indicated by the obtained indication.

Furthermore, a wireless device configured to be used in a wireless communication system and to adjust a maximum output power level of the wireless device is provided. The wireless device comprises an interface configured to communicatively couple the wireless device to the wireless communication system and a processing circuit. The processing circuit is configured to obtain an indication indicating a current level of criticality in the system in which a network node serving the wireless device is operating. The processing circuit is also configured to adjust the maximum output power level based on the current level of criticality indicated by the obtained indication.

In accordance with a second aspect, a method for enabling an adjustment of a maximum output power level of a wireless device based on a current level of criticality in the system is provided. The method is implemented by a network node of a wireless communication system serving the wireless device. The method comprises transmitting an indication to the wireless device. The indication indicates the current level of criticality in the system, wherein the level of criticality entails the maximum output power level of the wireless device to be adjusted.

Furthermore, a network node of a wireless communication system configured to serve a wireless device and to enable an adjustment of a maximum output power level of the wireless device based on a current level of criticality in the system is provided. The network node comprises an interface configured to communicatively couple the network node to the wireless device, and a processing circuit configured to transmit an indication to the wireless device via the interface. The indication indicates the current level of criticality in the system, wherein the level of criticality entails the maximum output power level of the wireless device to be adjusted.

An advantage of embodiments is that they allow for a better exploitation of UE output power capabilities, for example for a UE with UL MIMO or CLTD which has one or more PA capable of providing higher output power than the nominal maximum output power.

A further advantage of embodiments is that a higher power class UE configured mainly for public safety can be used in a normal cellular network for ordinary wireless services, while ensuring good performance in critical situations such as emergency, warning, or disaster situations.

These advantages may in turn allow for improved user experience when operating at higher output power, improved utilization efficiency of the communication systems, improved coverage and connectivity, maintained higher data rate, and reduced receiver blocking risk for adjacent systems when operating in non-critical situations.

Other objects, advantages and features of embodiments will be explained in the following detailed description when considered in conjunction with the accompanying drawings and claims.

BRIEF DESCRIPTION OF THE DRAWINGS

FIGS. 7a-b are block diagrams schematically illustrating a wireless device and a network node respectively according to embodiments.

DETAILED DESCRIPTION

Figure 1A:
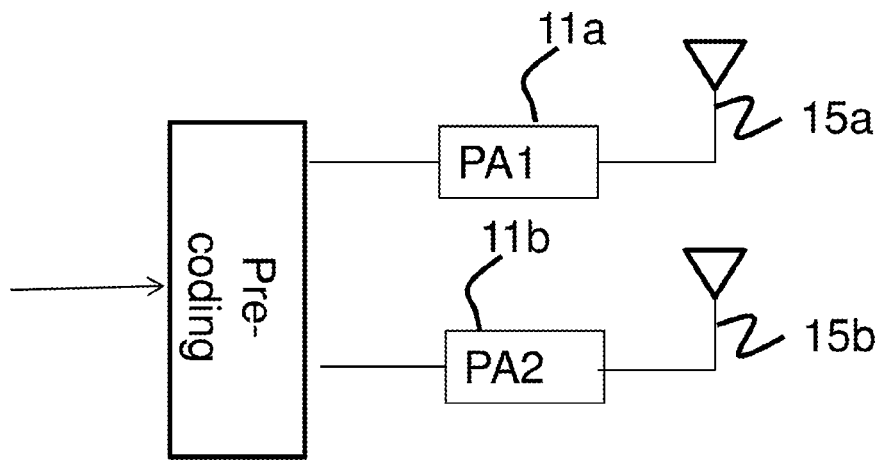
FIGS. 1a-b are block diagrams schematically illustrating UE architecture examples.
Figure 1B:
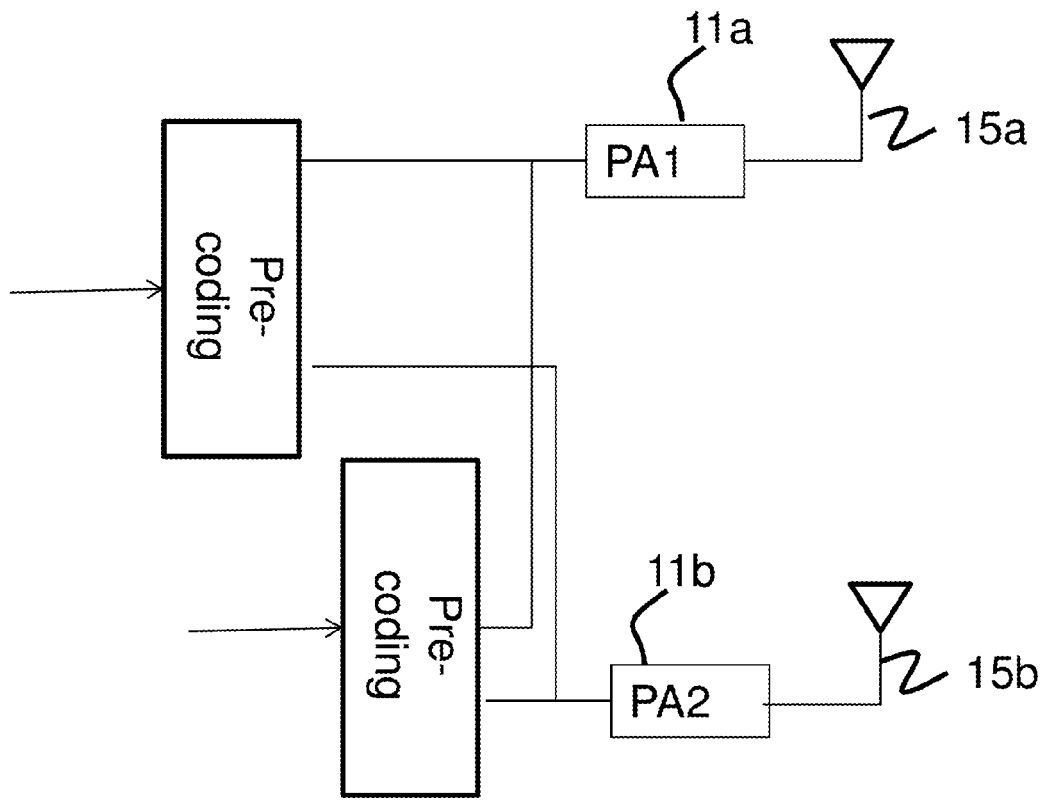

In the following, different aspects will be described in more detail with references to certain embodiments of the invention and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while embodiments of the invention are primarily described in the form of a method and a node, they may also be embodied in a computer program product as well as in a system comprising a computer processor and a memory coupled to the processor, wherein the memory is encoded with one or more programs that may perform the functions disclosed herein.

Embodiments are hereinafter mainly described in a non-limiting general context in relation to an example scenario where a UE capable of supporting a higher maximum output power class, typically a public safety UE, operates in a conventional LTE network and supports different output power settings depending on the levels of criticality in the network. However, it should be noted that the embodiments may also be applied to other types of wireless devices, such as wireless devices capable of UL MIMO, having a relatively low nominal maximum output power level although the device's physical maximum transmit power level may be higher. Also such a MIMO capable device may adjust its output power level to adapt to a level of criticality in the network. A UE is one type of wireless device, and hereinafter both UE and device will be used to denominate the wireless device capable of adjusting its output power based on a level of criticality. It should be noted that the term UE refers to any type of mobile terminal comprising e.g. a mobile relay, or a target device.

Although embodiments of the invention are described primarily for UTRAN and E-UTRAN, they are applicable to any type of radio access technology such as GSM/GERAN/EDGE, UTRAN FDD/TDD, E-UTRAN FDD/TDD, and CDMA2000, and are also applicable to any node which employs multi-standard radio (MSR). Furthermore some examples of network nodes which can receive UE output power capability information, which sends an indication of a level of criticality, and which can permit the UE to operate at higher output power are: base station, Node B, eNodeB, RNC, base station controller, CN node, positioning node, relay node, donor base station or any donor node which controls the relay node. Embodiments of the invention are also applicable to various scenarios including enhanced UL MIMO beyond 2×2 antenna configuration, CA, multi-flow data transmission and/or reception, Coordinated Multi-Point (CoMP) or combination of CA, multi-flow/CoMP.

The technology disclosed herein addresses the problem that wireless devices with higher output power class may not operate as a cellular device or may not operate in an optimal way in a cellular network. The solution is to let such devices adjust their maximum output power level to a current level of criticality. This is made possible by letting the device obtain an indication indicating the current level of criticality in the system in which a network node serving the wireless device is operating.

As used herein, a level of criticality in a system indicates the criticality with which a device needs to communicate with the system, and may relate to the urgency of such communication. For example, it may not be very critical for the device to communicate with the system under normal situations, i.e. the level of criticality is low. However, it may be very critical for the device to communicate with the system during an emergency situation, i.e. the level of criticality is high. An emergency situation may specifically affect the device's user or more generally affect multiple users in the system. The level of criticality may additionally or alternatively relate to the importance of the communication's content or simply to the importance of maintaining the ability to communicate. For instance, under some circumstances it may be very critical that the device maintains the current ability to connect and otherwise communicate with the system. Indeed, even if the device does not currently need to quickly communicate important information to the system, the device may need to do so in the near future.

One or more embodiments herein include a set of pre-determined rules and/or signaling means enabling a UE capable of supporting a higher maximum output power class to operate in a network with different levels of criticality. Optional embodiments also enable requirements associated with the criticality level of the network to be met by the UE.

More specifically, one embodiment herein comprises a method in a UE capable of operating in at least two wireless communication system scenarios, which first and second scenarios are associated with different levels of criticality. The method comprises the steps of:

Acquiring an indication, which indication enables the UE to determine whether it is operating in first or in second scenario or to determine the criticality level of the network operation scenario. The indication is based on a pre-defined rule or on information received from a network node.

Adjusting its maximum output power according to the determined first or second scenario or the criticality level of the network operation scenario.

Optionally also meeting pre-defined requirements depending upon the determined first or second scenario or the criticality level of the network operation scenario.

The method in the UE capable of supporting a higher maximum output power may further comprise the steps of:

Signaling its capability to a network node, indicating that it is capable of adjusting its maximum output power and meeting pre-defined requirements depending upon the criticality level associated with the network operation scenario. The capability may be sent proactively or based on received request from the network node.

Embodiments also comprise a method in a network node, the method comprising the steps of:

Receiving the UE capability information that the UE is capable of adjusting its output power and meeting requirements depending upon the criticality level of the network operation scenario.

Sending an indicator indicating criticality level of the network operation scenario, or indicating whether the network node operates in first or in second scenario thereby assisting the UE to operate according to said indicated scenario.

The method in the network node may further comprise the steps of:

Performing one or more radio operation tasks depending upon the received UE capability and/or UE operation according to the criticality of the scenario. The tasks may comprise admission control, cell change, and/or a selection of radio network operational parameter.

Signaling or forwarding received UE capability information and/or information associated with radio operation tasks to another network node. The other network node may use this for one or more radio network management tasks, such as network planning, network dimensioning, radio resource management, and/or configuration of one or more mobility parameters.

Figure 2:
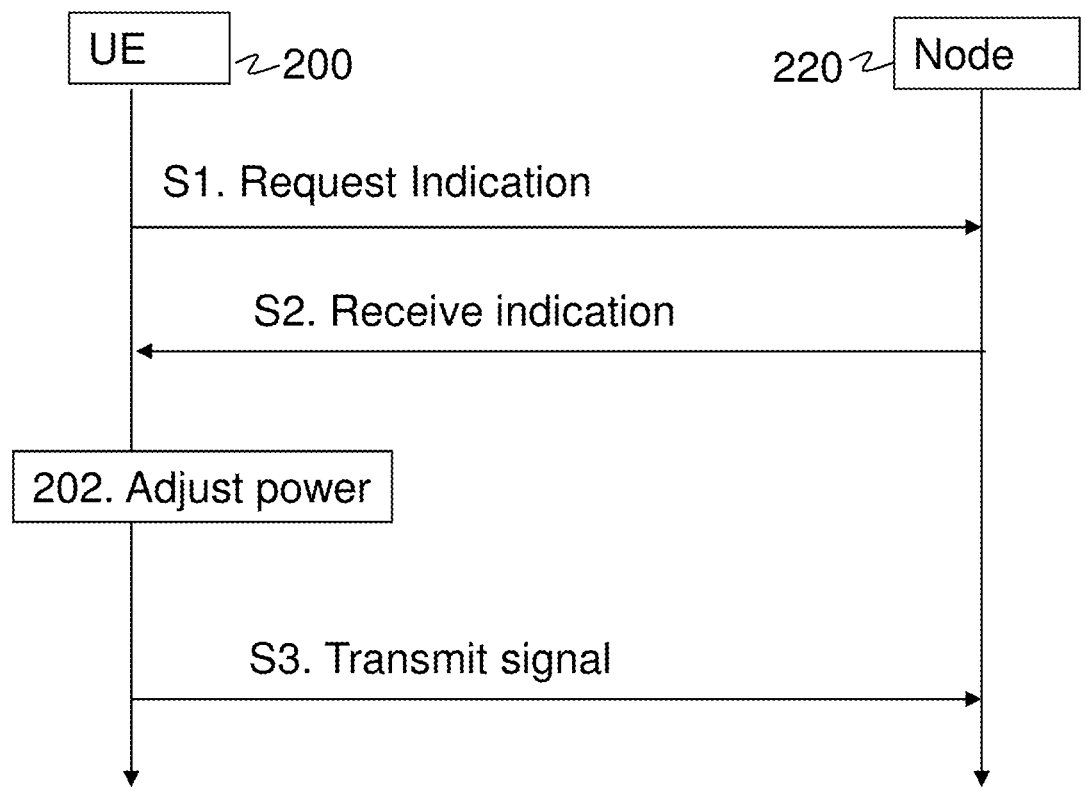
FIG. 2 is a signaling diagram schematically illustrating an embodiment of the invention.

Embodiments of the present invention are described in more details in the following sections:

1. Method in a UE of determining criticality level of the network operation scenario and adjusting its operation
2. Method in a UE of signaling its capability to the network node
3. Method in a network node of performing radio operation tasks based on received UE capability or UE operation
4. Method in a network node of forwarding the UE received capability information or information related to radio operation tasks to another node
5. Method in another network node of using the received information for network management task The embodiments will be described with reference to the signaling diagram in FIG. 2.

1. Method in UE of Determining Criticality Level of Network Operation Scenario and Adjusting its Operation According to this embodiment, as one step the UE, 200, acquires or obtains an indication and uses this indication to determine the criticality level for the scenario of the system in which the serving node is operating. Based on the criticality level of the scenario, the UE adjusts, in 202, its maximum output power to a level which is associated with the current scenario. In addition the UE may meet the requirements associated with the current scenario. In S3, the UE transmits a signal to the network node at a transmit power equal to or below the adjusted maximum output power level.

In the following sections, first the mechanisms to determine the criticality level of an operation scenario are described. A few examples of scenarios where a UE may have to adjust its maximum output power are also described. In some scenarios, the UE may for example extend its output power or operate at a higher output power level while also disregarding the P-MPR or any power reduction required to meet RF exposure requirements, depending on the criticality level of the scenarios.

Mechanism to Acquire Indication Related to Operational Scenario

The indication can be acquired or obtained by the UE by different means. The different means may also depend on a particular scenario. The indication may be expressed in terms of a pre-defined identifier mapping to a scenario. Examples of identifiers mapping to scenarios is 0 and 1 mapping to public safety network and mobile communication network respectively. The indication may also be expressed in multi-levels, each multi-level corresponding to different criticality levels or states. Assuming e.g. four levels (1, 2, 3, and 4), level 1 may be pre-defined as the most critical scenario or communication system, and level 4 may be pre-defined as the least critical.

The indication may be received by an explicit mechanism (embodiment A) or an implicit mechanism (embodiment B).

A. Examples of Explicit Mechanisms

In an explicit mechanism the UE is explicitly informed about the criticality level of the scenario as explained in the examples below.

A1. Explicit network signaling (illustrated in FIG. 2): This is the most reliable mechanism in that an indication or associated information is sent to the UE by the network node. In one example the serving radio network node sends it via RRC or MAC signaling. The information may be sent to the UE via UE specific signaling or via a broadcast channel. For example the serving network node can signal to the UE that the serving network node is operating in a public safety network. The indication may be sent by the network node proactively, or in response to a request from the UE. One example embodiment is illustrated in the signaling diagram of FIG. 2, where the UE 200 requests an indication of the current level of criticality from the network node 220 in S1, and the network node 220 replies with an indication in S2. For example, the UE may inform the network that it has to operate at higher output power in order to reach the network due to emergency or due to a coverage loss. The UE may also indicate the amount of additional power required above the nominal value to maintain the coverage or the emergency call. Upon receiving the UE indication indicating the amount of additional power, the network decides whether to extend the maximum output power of the UE or not and informs the UE accordingly. The network may also indicate the amount of power by which the UE maximum output power may be increased. The UE may also indicate to the network whether the coverage improves, whether the emergency call is terminated, or whether the network becomes easily reachable. In response the network may re-configure the UE maximum output power to its nominal value or to a value below the nominal value (e.g. when in small cell). Yet in another example the network itself autonomously detects that the UE maximum output power should be extended in order to retain the coverage or to ensure that the emergency call can be served. The autonomous detection can be based on the UE reported measurements such as power headroom or UE mean output power and/or the uplink received quality of the signals transmitted by the UE. The network can also identify the criticality level associated with the call i.e. whether it is a normal call or an emergency call or if there is a warning situation. Based on the autonomous detection and the criticality level of the situation the network may decide to extend the UE maximum output power. In that case the network via explicit signaling permits the UE to extend its maximum output power and to meet the corresponding pre-defined requirements. The network may also indicate the amount of power by which the UE maximum output power may be increased. Upon detecting the improvement in the coverage or upon the completion of the emergency call or critical state, the network re-configures the UE maximum power to its nominal value or to a value below the nominal value (e.g. when in small cell). The UE may also disregard the P-MPR or avoid any power reduction required to meet RF exposure requirements. The network may also explicitly indicate this to the UE i.e. that it can disregard the fulfillment of the P-MPR or similar requirement.

A2. Subscriber controlled indication: Another example of explicit mechanism is a subscriber indicating this to the UE e.g. by entering data or pressing specific key or combination of keys that the UE should operate in mobile communication mode. In one embodiment the subscriber may even be requested on the screen of the UE, e.g. triggered by an application program, to indicate whether the UE should be allowed to operate at higher power level or not. The UE may notify the subscriber that the UE cannot serve or guarantee the expected/requested data rate or cannot serve the emergency call unless the UE power is allowed to be exceeded above its nominal maximum output power value. The UE may also disregard the P-MPR or avoid any power reduction required to meet RF exposure requirements. The UE screen may also display the cause of extending the maximum output power e.g. type of scenario, emergency call or loss of coverage or warning. Alternatively the embedded software or the application program may prompt the subscriber or the end user to adjust the UE maximum output power to a higher value. Upon positive response from the subscriber, e.g. by selecting or pressing 'YES' or by pressing a specific or designated key or button on the UE, the UE may start operating at the higher output power and meet the associated requirements. Meanwhile, after the session is over the maximum output power of a UE may be restored automatically by the UE and meet the previous requirements, i.e. related to normal operation or a normal criticality level. Alternatively, the prompt message may be generated to let the end user decide whether the UE should restore its maximum output power or not. Upon permission from the subscriber or based on the explicit request from the subscriber that the UE is allowed to increase its maximum output power, the UE may also report or indicate to the network node that its current maximum output power is higher than its nominal maximum output power. For example the UE may report this to the RNC, Node B, eNode B, or base station. The indication to the network node may also contain additional information related to the maximum output power. This additional information may for be used by the network to correctly interpret the relevant UE measurements such as power headroom (PH), which is typically used for the radio resource management (e.g. scheduling, resource allocation). The UE may also notify the network when its maximum output power is restored to the nominal level.

B. Examples of Implicit Mechanisms

In an implicit mechanism the UE indirectly determines the criticality level of the scenario in which the serving network node is operating. This may be triggered by different mechanisms described under B1 to B6 below.

B1. UE emission control parameter: The emission control parameter signaled to the UE indicates the value associated with any emission requirement which the UE is supposed to meet when transmitting signals in the uplink. The examples of emission requirements are out of band emissions or more specifically 'additional spurious emission', or RF exposure requirements. Typically each emission control parameter may be associated with each emission requirement. Hence more than one emission control parameters for the same second node may be signaled to the UE. Examples of emission control parameters are the NS parameter and a parameter for managing or controlling RF exposure, which are signaled to the UE. The NS value is used by the UE to apply certain A-MPR, i.e. an MPR, to meet additional emission requirements, as already described previously. The network may signal different emission control parameter values depending upon the criticality level of the network scenario. For example A-MPR may be 0 dB for public safety operation but 10 dB for normal mobile communication. Hence if received NS value corresponds to A-MPR of 10 dB, the UE may assume that it is operating under normal mobile communication; accordingly it may meet the corresponding requirements for mobile communication. The NS parameter signaled to the UE may thus be viewed as an implicit indication of the current level of criticality.

B2. Depending upon geographical location: Certain location's or geographical region's frequency bands, or certain carriers, or part of a spectrum within a frequency band may be pre-determined to be used with higher level of criticality e.g. for public safety. However outside a certain region the same carriers or part of spectrum may be used for normal mobile communication services. Such information may thus implicitly indicate a certain level of criticality.

B3. Carrier frequency of operation: Certain carriers or part of spectrum may be pre-defined to be used for a certain scenario regardless of the location.

B4. Time of the day: It may be pre-defined that during certain days or even during certain part of the day the criticality level of the network changes. The actual criticality level applicable during the time may also be pre-defined. This may also be combined with location information. For example high level dignitaries may be gathered for a conference during certain time of each day for up to few days. In such scenario the criticality level of certain network may be increased to ensure security and safety.

B5. Indicator or a message associated with an emergency or critical situation: The UE may acquire warning information related to an emergency situation such as a fire, a tsunami, or a situation associated with any man made or natural disaster. The UE may use this information to determine that it is operating in a critical scenario, i.e. as an indication of a current level of criticality. In response the UE may adjust its maximum output power level and meet or operate according to the requirements corresponding to the determined criticality level. For example the requirements to be met may correspond to the adjusted maximum output power, which in turn depends upon the criticality level of the emergency. The UE may also inform the network that it is using a higher maximum output power and is meeting the corresponding requirements.

B6. Pre-defined rules: In this embodiment, a pre-defined rule is the indicator of the level of criticality. According to the pre-defined rule principle the UE may under certain critical scenarios autonomously increase its maximum output power or operate using higher than usual output power, e.g. 31 dBm for PS capable UE or 26 dBm for UL MIMO capable UE, and meet the corresponding requirements. In remaining scenarios the UE may operate using normal output power, e.g. 23 dBm, and meet the corresponding requirements. Examples of critical operation scenarios are described in the next section. The amount by which it is allowed to increase its maximum output power under critical circumstances may also be pre-defined in the standard, e.g. 3 dB. Optionally the UE may also inform the network that it has increased its maximum output power over a certain time citing also the reason for extending the maximum output power e.g. due to emergency calls or due to loosing coverage. Conformance tests can be defined to make sure that the UE only extends its maximum output power in pre-determined scenarios e.g. under emergency situation. The UE may also indicate to the network that it has adjusted its maximum output power in accordance with the determined criticality of the scenario. It may also indicate that it is meeting requirements according to the current network operating scenario. The UE may particularly inform the network in case it determines the criticality level of the scenario by implicit means.

A+B. Combination of Explicit and Implicit Mechanism

According to this embodiment any of the methods described in sections/embodiments A and B may be combined by the UE to determine the criticality of the scenario and consequently decide whether the UE is allowed to extend its maximum output power or not. For example the pre-defined rules may define two scenarios under which the UE may potentially extend the coverage e.g. emergency call (scenario-ID#0) and when UE looses coverage but cannot connect to the network over certain time period (scenario-ID#1). In one embodiment the UE may autonomously detected the scenario and increase its maximum power. In another embodiment the network may permit the UE to extend its maximum power only in emergency situation by pre-configuring the UE with the identifier (scenario-ID#0) i.e. ID #0=PERMITTED, ID#1=NOT PERMITTED. The network may re-configure the UE depending upon the situation. For example, when coverage is sparse or when the network is partly disrupted the network may activate both scenario-ID#0 and scenario-ID#1.

Scenarios for Adjusting UE Maximum Output Power

A few example scenarios where the UE may adjust its maximum output power and meet the requirements associated with the scenario are described hereinafter.

a. Public safety capable UE operation for mobile communication: In one example consider a UE that is capable of higher output power class, e.g. 31 dBm. In prior art it only operates in one network operation scenario, i.e. a first wireless communication system such as a public safety network. This UE now camps on to a second wireless communication system, i.e. a mobile or cellular communication system. The first system or first operation scenario is associated with or have a higher criticality level compared to that of the second system or second operation scenario. The UE determines the criticality level of the second system or second operation scenario by acquiring or obtaining an indication. The methods of determining the criticality level are described above. For example the UE may receive an indicator by reading the broadcast channel of the network node on which it is currently camping. The UE then adjusts its maximum output power associated with the second system or second operation scenario. Since the second system or operation scenario has a lower criticality level, the UE may lower its maximum output power compared to its capability, e.g. down to 23 dBm. In addition to adjusting its maximum output power, the UE may also meet one or more requirements which are associated with the second system or second scenario, such as radio emission requirements. The UE may lower its maximum output power and meet requirements associated with the determined system or scenario either based on a pre-defined rule or based on an explicit request from the network node. For example in the former case an association between UE maximum output power/requirements and level of criticality of the operation scenario or of a communication system may be pre-defined. In the latter case the network may explicitly indicate to the UE which of the pre-defined requirements that are to be met by the UE. Examples of pre-defined requirements are radio requirements such as ACLR, additional spurious emission, UE maximum output power (MOP) tolerance etc. For example when operating in the first scenario, i.e. the public safety network, the UE may have to meet ACLR=40 dB. On the other hand when operating in the second scenario, i.e. the mobile communication network, the UE may have to meet ACLR=30 dB. In another example when operating in the first scenario the UE may have to meet MOP tolerance of +1/−4 dB. On the other hand when operating in the second scenario the UE may have to meet MOP tolerance of ±2 dB.

b. Emergency calls: According to this embodiment during an emergency call the UE which bears additional maximum output power capability, such as an UL MIMO capable UE, may be allowed to operate at a maximum output power above its nominal value. The UE may also disregard the P-MPR or avoid any power reduction required to meet RF exposure requirements. This may be based on a pre-defined rule, or the network may explicitly indicate that in emergency situation or in certain emergency situation, such as an emergency level 3 or above in scale of 0 to 5, it extends its power and disregards the fulfillment of the P-MPR or similar requirement. This is because the emergency situation may be considered to be an operation scenario of a very high criticality level. The indication about this scenario may be acquired by the UE by various means. For example the emergency call may be initiated by the subscriber, or by another subscriber, or by the network, such as a warning of an impending disaster. The emergency call is typically initiated when the subscriber safety is under threat. In this operation scenario the ultimate objective is to prioritize the emergency calls over all the existing operations and ongoing services in the UE. This approach will ensure that any emergency or related call from the subscriber is furnished immediately while ensuring good quality of service.

c. Upon loosing coverage. The uplink coverage which is the major limiting factor may be poor due to various factors e.g. network is not fully operational, large cells with sparsely deployed base stations especially where population density is low. Some of these scenarios are further described hereinafter.

Partial network disruption: According to this embodiment the UE which bears additional maximum output power capability, e.g. an UL MIMO capable UE, may be allowed to operate at an output power above its nominal value in case the network is partly disrupted. The disruption may occur to the natural or man made disaster such as a tsunami, an earthquake, a fire, or a power failure. Under such disastrous or catastrophic situation some of the network sites may become partly or fully disrupted. The network may also be partly disrupted, i.e. some of the base stations are turned off, due to other reasons such as power saving, or network planning. It should be noted that the uplink coverage is the major bottleneck in most systems. This means that the UEs which are out of range for the operational base stations cannot be served or adequately served by the base stations which have poor coverage. However, in such circumstances it is important that the UEs are able to maintain connection with the network especially so that they can receive the relevant information. Therefore in such scenarios, the UE may be allowed to operate at higher output power beyond its nominal maximum output power value. This will ensure that the UE is able to retain the connection with the network even though the network is unable to fully operate due to the disaster.

Low base station deployment density: In some countries, such as in Australia, Canada and Russia, the radio network node, e.g. Node B, eNode B, base station, or relay, deployment density is low due to low population density, sparsely located towns and vast territories. In other countries, there are also bad coverage areas due to low revenue in a low density area. In these deployment scenarios the uplink can be a severe bottleneck. Therefore, embodiments of the invention also exploit the fact that the UE which bear an additional maximum output power capability may operate at higher power than their nominal maximum output power in such operation scenarios.

PRACH coverage limitation: Some advanced receivers such as Successive Interference Cancellation and Turbo interference cancellation can have remarkable performance gain by multiple loop signal processing but introduce considerable processing delay. PRACH channel is used for the random access at the start of the radio connection setup or at cell change e.g. at handover. In practice, the network node, e.g. the base station, should send a response, i.e. a random access (RA) response, for the detected PRACH sequence received from the UE according to the specified or pre-defined or configurable tight timing between PRACH reception and RA response. The processing delay limit for the data reception, i.e. normal data on shared or dedicated channel, is much looser compared to the PRACH processing. For instance, in WCDMA/HSPA the HARQ round trip time for HSDPA/HSUPA with 2 ms transmission time interval is 16 ms while the RACH response should be sent less than 2 ms after the PRACH is received. Hence the process delay for PRACH should be smaller than the process delay for the data part. This means less or very low delay or time for processing loop for interference cancellation is available for the processing of the received PRACH at the base station. According to this embodiment, when sending PRACH and when an advanced receiver is used in the network for receiving the said PRACH, the UE is allowed to operate according to its higher output power class capability for sending the said PRACH. A higher output power transmission will reduce the processing time of the advanced receiver used at the base station. This configuration or enabler can be broadcasted or signaled on a UE specific channel by the network to the UE or the rule can be predefined. It may also be pre-defined that the UE is allowed to extend its power provided a certain type of advanced receiver is used in the network node for receiving PRACH. For example the network may signal to the UE the type of receiver used explicitly, or may implicitly indicate whether it should or is allowed to extend its power beyond the normal limit when sending the PRACH. The specific scenarios under which UE may extend its PRACH transmit power may also be pre-defined or indicated to the UE. For example the UE may be allowed to extend its PRACH power only when doing initial access. In another example UE may be allowed to do so when accessing the cell at the time of handover. In yet another example the UE may be allowed to do so when one or more other conditions mentioned in previous sections are met, e.g. when there is an emergency situation, or when there is partial disruption of the network. Furthermore this may be allowed for certain UE categories or UE capability or UE types in terms of power capability. For example it may be allowed, e.g. by signaling means or by a pre-defined rule, that an UL MIMO capable UE supporting a higher power class is allowed to extend its power beyond the normal maximum output power when sending RACH. The difference between the maximum power limit of the data transmission and PRACH transmission can be in relation to the estimated processing gain difference of the said advanced receivers so that the PRACH can have similar to or better coverage than the data transmission.

2. Method in UE of Signaling its Capability Operating According to Criticality of Scenario All UEs which support higher output power, such as public safety capable UEs, may not be capable of operating in networks or in scenarios with different levels of criticality. This means that the network is not aware of which UEs bear such capability. On the other hand there may be a UE which can operate by adjusting its maximum power and according to a set of requirements corresponding to the level of criticality of scenario.

Therefore according to this embodiment the UE which supports such capability may inform the network node that it is capable of adjusting its maximum output power and meeting pre-defined requirements depending upon a criticality level associated with a network operation scenario. The acquired capability information may be used by the network for taking one or more actions, e.g. decisions related to admission control, or cell change, as described below. Typically the UE may report this capability to the serving network node, e.g. an RNC in HSPA or an eNode B in LTE. However it may also report the capability to other nodes such as a CN node, or positioning node.

The reported capability may contain additional information. For instance the additional information may comprise of frequency band indicators, RATs, and a bandwidth for which the UE supports this capability. The information may also indicate whether UE can determine the level of criticality of an operation scenario by implicit means (embodiment B above), by explicit means (embodiment A above) or by combination thereof.

The UE may send the capability information to the network node in any of the following manners:

Proactive reporting without receiving an explicit request from the network node.

Reporting upon receiving any explicit request from the network node. The explicit request can be sent by the network at any time. For example the request for the capability reporting can be sent during initial setup or after handover.

In case of proactive reporting the UE may report its capability during one or more of the following occasions:

During initial setup or call setup e.g. when establishing the RRC connection.

During cell change e.g. handover, primary carrier change in multi-carrier operation, PCell change in multi-carrier operation, RRC re-establishment, RRC connection release with re-direction.

3. Method in a Network Node of Performing Radio Operation Tasks Based on Received UE Capability or UE Operation The network node may perform one or more radio operation tasks or RRM actions depending upon UE capability or UE operation. Examples of radio operation tasks are admission control, cell change, load balancing, and selection of network receiver type. The actual action or task may depend upon the criticality level of a scenario and/or a type of network, i.e. cellular or public safety network. It may also depend upon the number of UEs with higher output power intended to be served by a network node or in a network or in a certain geographical area.

For example a network node operating in a scenario with lower level of criticality may admit only a certain number of UEs that are required to transmit with a higher maximum output power. Therefore the serving node may perform an admission control, which takes into account the urgency or criticality of the situation experienced by the UE. It may only permit those UEs with higher output power whose situation is more critical, such as those located further away without adequate coverage or which are in an emergency situation.

In another example of operation tasks, the network node may use a more advanced receiver for signal reception if a number of UEs operating with higher output power exceeds a threshold. Examples of more advanced receivers are interference cancellation receivers, and interference rejection combining receiver. This is to ensure that the network can handle reception of signal when more users operating with higher power are in use.

In yet another example the network may perform cell change depending upon a criticality level of the network operation scenario and/or depending on a number of users with higher output power. For example if the network node, e.g. the serving eNodeB, cannot handle all the users, then it may trigger a cell change such as a handover, a primary cell change, a primary CC change, or an RRC connection release with redirection.

4. Method in a Network Node of Forwarding the UE Received Capability Information or Information Related to Radio Operation Tasks to Another Node According to this embodiment the network node, e.g. the serving network node, forwards the received UE capability information, i.e. the information on the capability to operate in a scenario or a network with a different level of criticality, to another network node. In addition, the network node may also inform another network node about one or more radio operation tasks performed by the network node as described in previous section 3. The network node may also indicate the number of UEs operating with higher output power over certain band/carriers/RATs, in a particular criticality level of scenario. For example it may indicate that on the average K number of higher power class UEs per day operate in mobile communication network for normal operation.

For example in HSPA the serving node, e.g. RNC, may signal this information to another node, e.g. NodeB, over the Iub interface. In HSPA the RNC can also signal the above indicated UE capability and other information to another RNC over the Iur interface. Similarly, in LTE the first network node, e.g. serving eNodeB, may send the above information to a neighboring eNodeB over the X2 interface. The receiving eNodeB may use this information during or after a cell change such as a handover, a primary cell change, or a primary carrier change. The network node may also signal the above mentioned information to other type of nodes such as positioning node, e.g. to Enhanced Serving Mobile Location Center (E-SMLC) in LTE, Minimizing Drive Test (MDT) node, Self Organizing Network (SON) nodes, Operation and Maintenance node, Operation Support System (OSS) node, or network monitoring node. The above sets of information may be sent to the other node mentioned above proactively or in response to an explicit request from the target node.

5. Method in Another Network Node of Using the Received Information for Network Management Task The acquired information related to the UE capability, performed radio operation tasks or RRM actions and statistics of utilization of users in different scenarios may be used by another node for one or more network management tasks. Examples of network management tasks are network/cell planning, configuration of network parameters, network dimensioning such as a deployment of a number of nodes in a region, bandwidth allocation in different radio network nodes, and upgrading of network to accommodate a number of users using higher output power in different levels of scenarios.

Methods and Apparatus According to the Above Embodiments

Figure 3A:
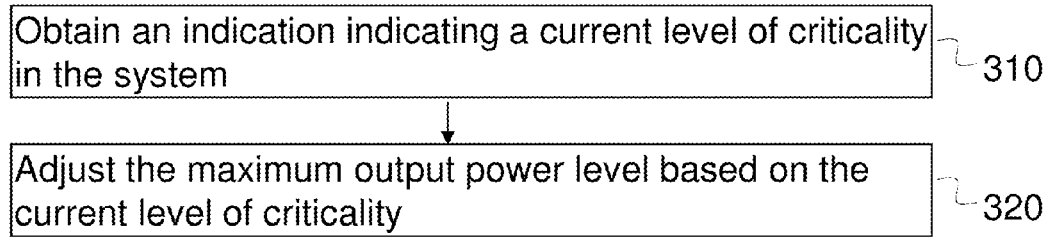
FIGS. 3a-c are flowcharts schematically illustrating a method in a wireless device according to embodiments.

FIG. 3a is a flow chart schematically illustrating a method for adjusting a maximum output power level of a wireless device such as a UE according to one embodiment. The method is implemented by the wireless device in a wireless communication system, and comprises:

310: Obtaining an indication indicating a current level of criticality in the system in which a network node serving the wireless device is operating.

Figure 3B:
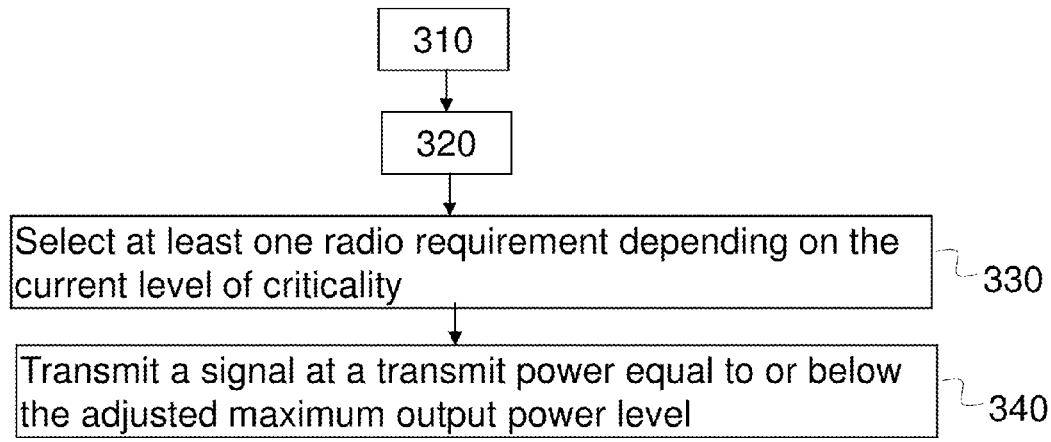

320: Adjusting the maximum output power level based on the current level of criticality indicated by the obtained indication FIG. 3b is a flow chart schematically illustrating the method according to another embodiment. The method comprises in addition to step 310 and 320 described above:

330: The optional step of selecting at least one radio requirement depending on the current level of criticality indicated by the obtained indication. One example of a radio requirement is a requirement on radio emission that the wireless device must fulfill in a certain operation scenario, as described previously.

340: Transmitting a signal to the network node serving the wireless device at a transmit power equal to or below the adjusted maximum output power level. If step 330 is performed, the signal is transmitted at a transmit power such that the selected at least one radio requirement is met.

Figure 3C:
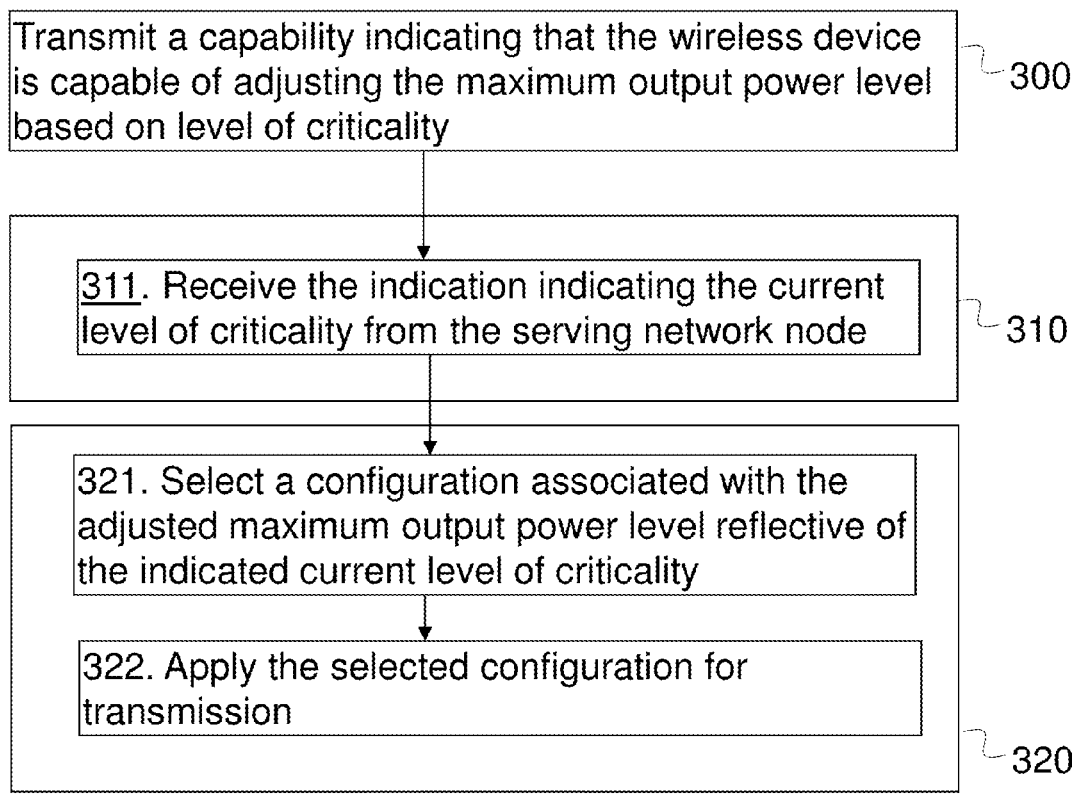

FIG. 3c is a flow chart schematically illustrating the method according to still another embodiment. The method comprises the following:

300: Transmitting a capability indicating that the wireless device is capable of adjusting the maximum output power level based on level of criticality in the system. The capability is transmitted to the network node serving the wireless device.

Obtaining, 310, the indication indicating the current level of criticality comprises:

311: Receiving the indication indicating the current level of criticality from the network node serving the wireless device. The indication indicating the current level of criticality may be received in response to a request from the wireless device. The indication may comprise at least one of an identifier of level of criticality, and an amount of power by which the maximum output power level is to be adjusted. Receiving an identifier of the level of criticality is one example of an explicit mechanism for receiving the indicator, according to embodiment A described above. Alternatively, the indication may comprise at least one of warning information related to an emergency situation, and a parameter controlling a radio emission of the wireless device. In this case obtaining the indication indicating the current level of criticality also comprises determining the current level of criticality based on the received indication. This is an example of an implicit mechanism for indicating the level of criticality, as described for embodiment B above. A parameter controlling the radio emission of the wireless device may e.g. be the NS parameter, which may implicitly indicate a level of criticality as already described.

The step 320 of adjusting the maximum output power level comprises:

321: Selecting a configuration associated with the adjusted maximum output power level reflective of the indicated current level of criticality.

322: Applying the selected configuration for transmission.

In an alternative embodiment, obtaining the indication indicating the current level of criticality may comprise receiving the indication indicating the current level of criticality from a subscriber user interface of the wireless device. This is also a kind of explicit mechanism for indicating the level of criticality according to embodiment A.

Another implicit way of obtaining the indication may comprise determining the current level of criticality also based on at least one of the following:
measurements performed by the wireless device;
an ongoing call;
a geographical location of the wireless device;
a frequency used for transmission;
a time of the day; and
a pre-defined rule mapping an operation scenario to level of criticality.

In one embodiment, the method further comprises receiving a permission to adjust the maximum output power level, from the network node serving the wireless device, before adjusting the maximum output power level.

Figure 4:
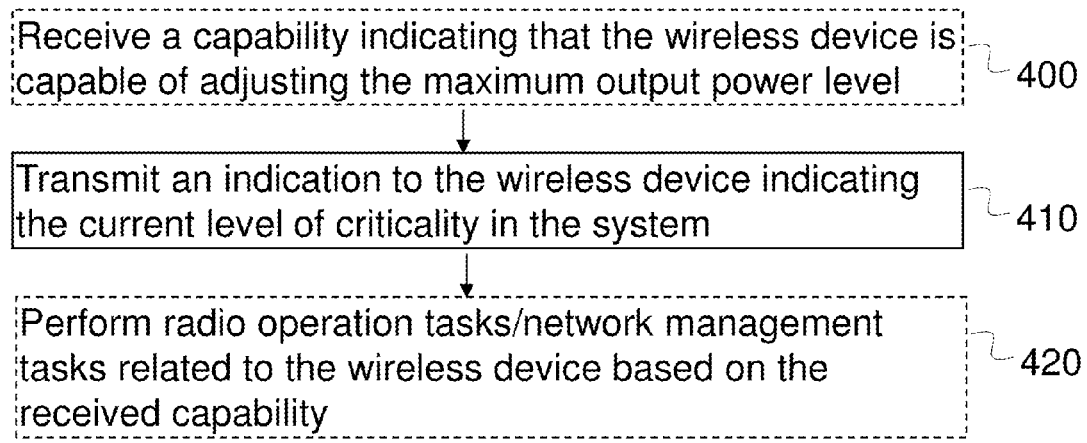
FIG. 4 is a flowchart schematically illustrating a method in a network node according to embodiments.

FIG. 4a is a flow chart schematically illustrating a method for enabling an adjustment of a maximum output power level of a wireless device based on a current level of criticality in the system according to one embodiment corresponding to the embodiment described with reference to FIG. 3a. The method is implemented by a network node of a wireless communication system serving the wireless device. The method comprises:

410: Transmitting an indication to the wireless device, the indication indicating the current level of criticality in the system. The level of criticality entails the maximum output power level of the wireless device to be adjusted. That is, by transmitting the indication, the network node enables the UE to adapt its output power to the level of criticality of the operations scenario it is in.

The method may also optionally comprise the following, corresponding to the embodiment described above with reference to FIG. 3c:

400: The initial step of receiving from the wireless device a capability indicating that the wireless device is capable of adjusting the maximum output power level based on level of criticality in the system. The capability may be received in response to a request from the network node. The received capability may also be forwarded to another network node, such as to a neighboring serving node or to an O&M node. The transmission of the indication indicating the current level of criticality in the system may thus be based on the received capability. Only UEs having the capability would thus be receiving the indication of the level of criticality.

420: Performing radio operation tasks and/or network management tasks related to the wireless device based on the received capability. The radio operation tasks and/or network management tasks may be performed based also on at least one of a type of the system in which the network node is operating; the current level of criticality in the system; and a number of wireless devices served by the network node and having indicated a capability of adjusting their respective maximum output power level.

Figure 5A:
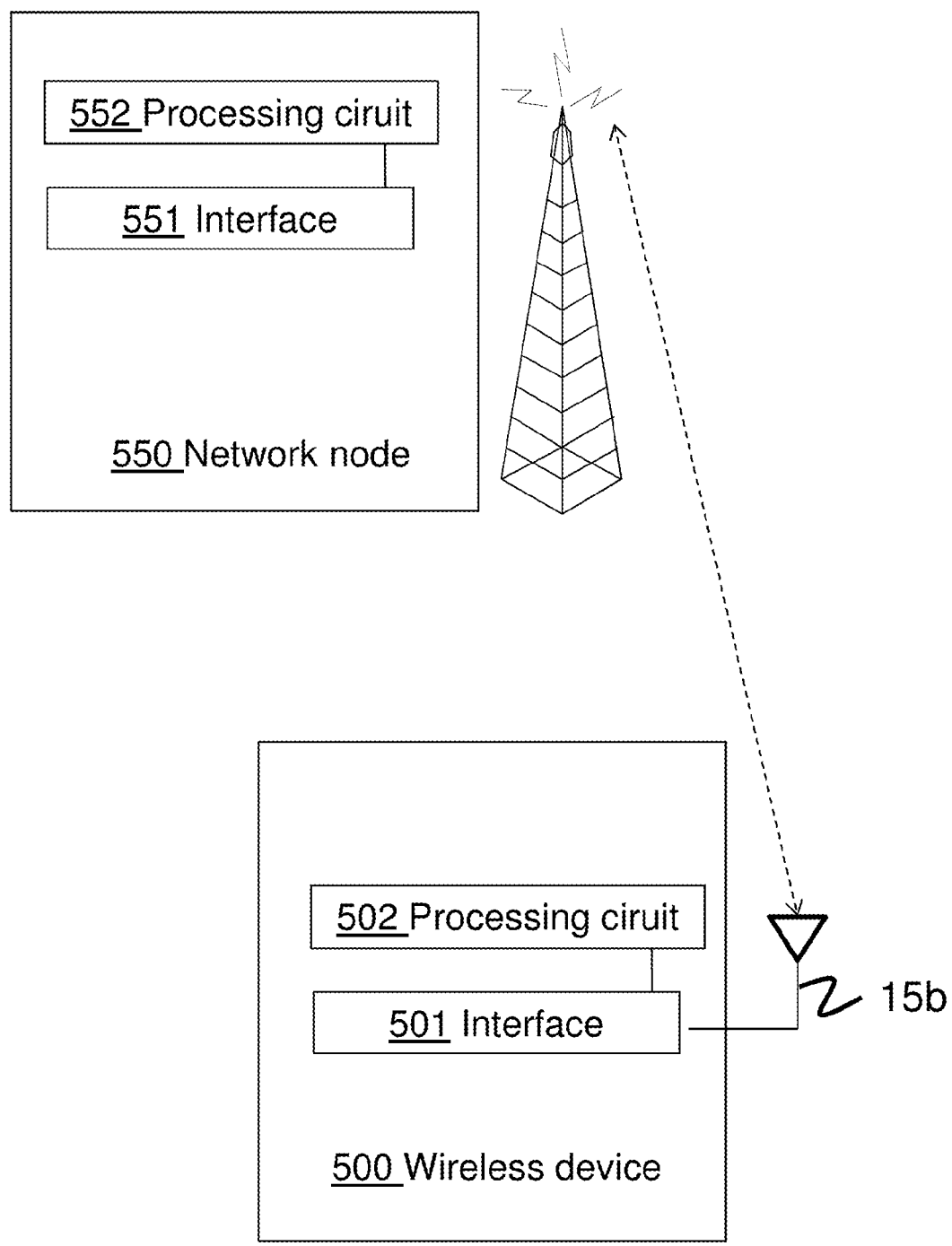
FIGS. 5a-b are block diagrams schematically illustrating a network node and a wireless device according to embodiments.

A wireless device 500 and a network node 550 are schematically illustrated in the block diagram in FIG. 5a, according to one embodiment. The wireless device 500 is configured to be used in a wireless communication system and to adjust a maximum output power level of the wireless device. The wireless device 500 comprises an interface 501 configured to communicatively couple the wireless device 500 to the wireless communication system. The interface is typically a transceiver coupled via an antenna port to one or more receiving and transmitting antennas. The wireless device also comprises a processing circuit 502. The processing circuit 502 is configured to obtain an indication indicating a current level of criticality in the system in which a network node serving the wireless device is operating. The processing circuit 502 is also configured to adjust the maximum output power level based on the current level of criticality indicated by the obtained indication. The processing circuit may be configured to, via the interface 501, transmit a signal to the network node serving the wireless device at a transmit power equal to or below the adjusted maximum output power level.

In one embodiment, the processing circuit 502 may be configured to select at least one radio requirement depending on the current level of criticality indicated by the obtained indication, and to transmit the signal via the interface at a transmit power such that the selected at least one radio requirement is met. Furthermore, the processing circuit 502 may be configured to transmit via the interface a capability indicating that the wireless device is capable of adjusting the maximum output power level based on level of criticality in the system. The capability is transmitted to the network node serving the wireless device.

In one embodiment, the processing circuit 502 may be configured to adjust the maximum output power level by selecting a configuration associated with the adjusted maximum output power level reflective of the indicated current level of criticality, and applying the selected configuration for transmission. Furthermore, the processing circuit 502 may be configured to obtain the indication indicating the current level of criticality by receiving the indication indicating the current level of criticality from the network node serving the wireless device via the interface. Optionally, the processing circuit 502 may be configured to receive the indication indicating the current level of criticality in response to a request from the wireless device. Alternatively, the processing circuit may be configured to obtain the indication indicating the current level of criticality by receiving the indication indicating the current level of criticality from a subscriber user interface of the wireless device.

The indication indicating the current level of criticality may comprise at least one of an identifier of level of criticality, and an amount of power by which the maximum output power level is to be adjusted. Alternatively, the indication indicating the current level of criticality may comprise at least one of warning information related to an emergency situation, and a parameter controlling a radio emission of the wireless device. In this case the processing circuit 502 may be configured to obtain the indication indicating the current level of criticality by also determining the current level of criticality based on the received indication.

Furthermore, the processing circuit 502 may be configured to obtain the indication by determining the current level of criticality based on at least one of measurements performed by the wireless device; an ongoing call; a geographical location of the wireless device; a frequency used for transmission; a time of the day; and a pre-defined rule mapping an operation scenario to level of criticality. In one embodiment, the processing circuit 502 is further configured to receive a permission to adjust the maximum output power level, from the network node serving the wireless device, before adjusting the maximum output power level.

The network node 550 of the wireless communication system is configured to serve the wireless device 500 and to enable an adjustment of a maximum output power level of the wireless device 500 based on a current level of criticality in the system. The network node 550 comprises an interface 551 configured to communicatively couple the network node 550 to the wireless device 500, and a processing circuit 552 configured to transmit an indication to the wireless device 500 via the interface 551. The indication indicates the current level of criticality in the system. The level of criticality entails the maximum output power level of the wireless device 500 to be adjusted.

The processing circuit 552 may be configured to receive from the wireless device 500 via the interface 551, a capability indicating that the wireless device is capable of adjusting the maximum output power level based on a level of criticality in the system. The processing circuit 552 may also be configured to transmit via the interface 551 the indication indicating the current level of criticality in the system based on the received capability. Further, the processing circuit 552 may be configured to receive via the interface the capability in response to a request from the network node. In one embodiment, the processing circuit is configured to perform radio operation tasks and/or network management tasks related to the wireless device based on the received capability. The processing circuit 552 may be configured to perform the radio operation tasks and/or network management tasks based also on at least one of a type of the system in which the network node is operating, the current level of criticality in the system, and a number of wireless devices served by the network node and having indicated a capability of adjusting their respective maximum output power level. The processing circuit 552 may also be configured to forward the received capability to another network node.

In an alternative way to describe the embodiments in FIG. 5a, the network node 550 and the wireless device 500 comprise a Central Processing Unit (CPU) each which may be a single unit or a plurality of units. Furthermore, the network node 550 and the wireless device comprise at least one computer program product (CPP) each in the form of a non-volatile memory, e.g. an EEPROM (Electrically Erasable Programmable Read-Only Memory), a flash memory or a disk drive. The CPP comprises a computer program, which in turn comprises code means which when run on the network node 550 and the wireless device 500 respectively, causes the CPU to perform steps of the procedure described earlier in conjunction with FIGS. 3a-c and 4. In other words, when said code means are run on the CPU, they correspond to the processing circuits 552/502 in the network node 550 and the wireless device 500 of FIG. 5a.

Figure 5B:
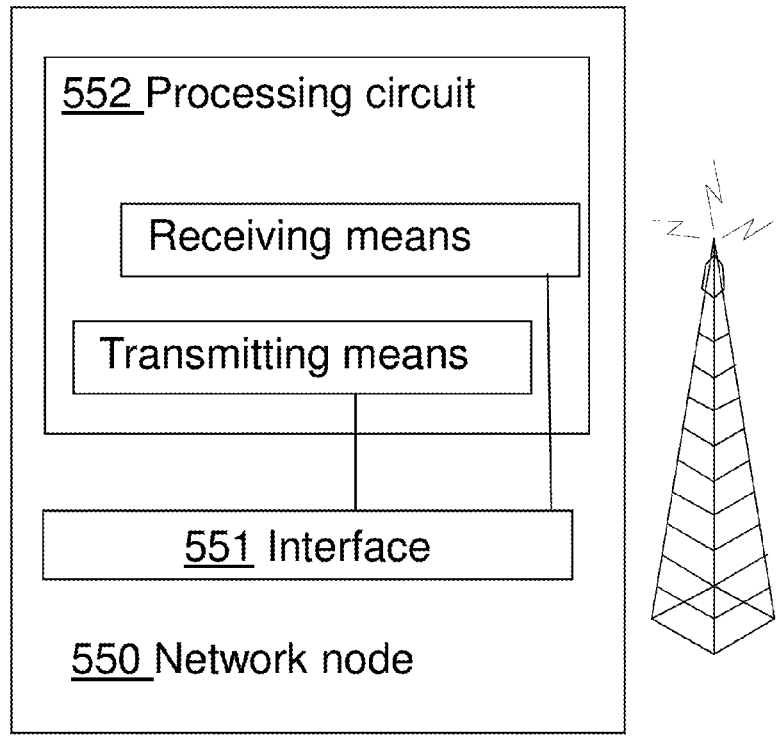
Figure 5B:
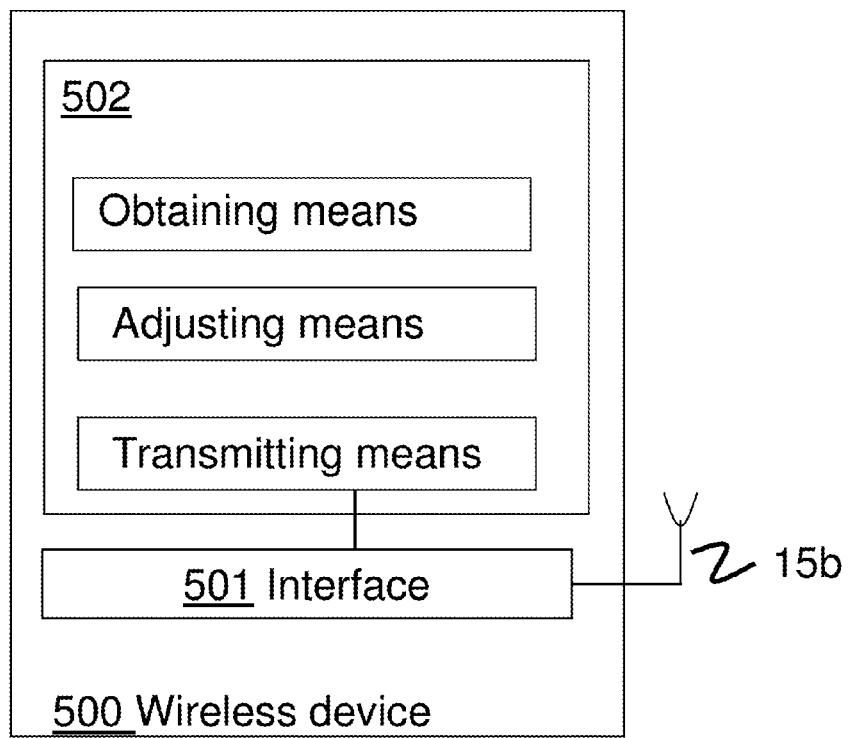

An alternative illustration of the wireless device 500 and the network node 550 is given in the block diagram in FIG. 5b.

The above mentioned and described embodiments are only given as examples and should not be limiting. Other solutions, uses, objectives, and functions within the scope of the accompanying patent claims may be possible.

Figure 6A:
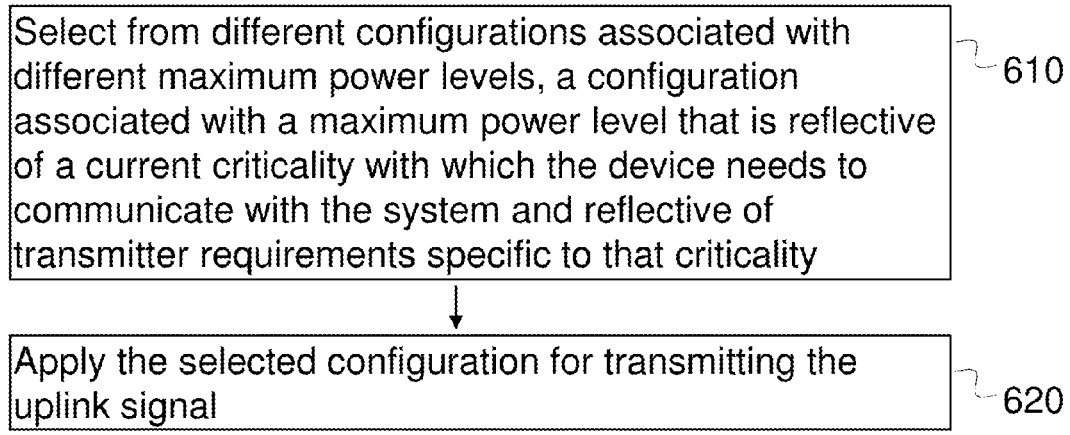
FIGS. 6a-b are flowcharts schematically illustrating a method in a wireless device and in a network node respectively according to embodiments.

In view of the above, those skilled in the art will readily appreciate that one or more embodiments herein generally include a method implemented by a wireless device for controlling the total power with which the device transmits an uplink signal in a wireless communication system. FIG. 6a illustrates such a method.

As shown in FIG. 6a, processing according to the method entails selecting, 610, from different defined configurations, i.e., modes or effective power classes, associated with different maximum transmit power levels, a configuration associated with a maximum transmit power level that is reflective of a current criticality with which the device needs to communicate with the system and reflective of transmitter requirements specific to that criticality. The method then includes applying 620 the selected configuration for transmitting the uplink signal.

As used herein, the criticality with which the device needs to communicate with the system may relate to the urgency of such communication. For example, it may not be very critical for the device to communicate with the system under normal situations, but it may be very critical during an emergency situation, where such a situation may specifically affect the device's user or more generally affect multiple users in the system. This criticality may additionally or alternatively relate to the importance of the communication's content or simply to the importance of maintaining the ability to communicate. For instance, under some circumstances it may be very critical that the device maintain the current ability to connect and otherwise communicate with the system. Indeed, even if the device does not currently need to quickly communicate important information to the system, the device may need to do so in the near future.

Because the criticality with which the device needs to communicate varies over time, the device herein supports multiple different configurations that are tailored for different criticalities. In particular, different configurations of the device set the maximum transmit power level to different levels, where these levels reflect different potential criticalities with which the device may need to communicate with the system (e.g., at different times). Accordingly, the device advantageously selects between the different configurations supported in order to employ a maximum transmit power level that reflects a current criticality with which the device needs to communicate with the system. In general, the device selects a configuration associated with a greater maximum transmit power level the greater the criticality with which the device needs to communicate with the system. In this regard, different levels of criticality may be defined and associated by the device with the different configurations.

At least one of the defined configurations may be associated with a nominal configuration that the device employs under normal circumstances according to defined standards or protocols of the device and/or system, where "normal" here does not necessarily correspond to a normal or non-emergency level of criticality. Selection of a configuration reflective of the current criticality may therefore entail adjusting the maximum transmit power level to deviate from a nominal maximum transmit power level still below the physical maximum supported by the device.

Consider, for instance, one or more embodiments where the device is nominally configured to communicate with a public safety system or network, e.g., a PSBB network. That is, the criticality with which the device normally communicates is relatively high, meaning that the device's nominal maximum transmit power is relatively high (e.g., 31 dBm). But when the device hands over or otherwise connects to a mobile or cellular communications system, the device may select a configuration associated with a maximum transmit power level (e.g., 24 dBm) that is reflective of a lesser criticality with which the device needs to communicate. In doing so, the device effectively adjusts the maximum transmit power to deviate from the relatively high nominal level.

By contrast, consider one or more other embodiments where the device is normally configured to communicate with a mobile or cellular communications system. That is, the criticality with which the device normally communicates is relatively low, meaning that the device's nominal maximum transmit power level is relatively low (e.g., 21 dBm). Despite this nominal level being relatively low, the device's physical maximum transmit power level may be higher (e.g., 24 dBm), as is the case for example where the device is capable of UL MIMO. Accordingly, when the criticality with which the device needs to communicate increases, e.g., when the device needs to communicate with urgency, needs to communicate important information, or needs to maintain the ability to communicate, the device may select a configuration associated with a maximum transmit power level (e.g., 24 dBm) that is reflective of a higher criticality. In doing so, the device effectively adjusts the maximum transmit power to deviate from the relatively low nominal level.

Notably, in at least some embodiments, the different configurations of the device are not only reflective of different potential criticalities with which the device may need to communicate with the system, but they are also reflective of transmitter requirements specific to a corresponding criticality. That is, depending on the criticality associated with a configuration, that configuration may impose different transmitter requirements on the device, including for instance different emissions requirements, e.g., ACLR, SEM, or SAR thresholds. In this way, the different configurations may prioritize the transmitter requirements differently in relation to the criticality with which the device needs to communicate. For example, a configuration associated with a relatively high criticality may impose some transmitter requirements, e.g., a SAR threshold, or ACLR threshold, that are more relaxed than corresponding requirements imposed by a configuration associated with a relatively low criticality.

Regardless, the device's selection and application of a configuration may be performed responsive to obtaining an indication of the criticality with which the device is to communicate, or an indication related to a configuration to be selected, as described above. In some embodiments, for example, the device's selection and application of a configuration may be performed autonomously based upon the device's recognition of its criticality for communication. This recognition may be based, for instance, on receiving control signaling from the system indicating a criticality level applicable for a plurality of devices, e.g., within a cell or the entire system, or on receiving input from a user of the device. Alternatively, the device's selection and application of a configuration may be performed in accordance with a selection control command received from the system. This control command may be received responsive to sending the system a request for operation in a particular configuration. Correspondingly, one or more embodiments herein include counterpart processing in a network node for performing the above mentioned control signaling.

Figure 6B:
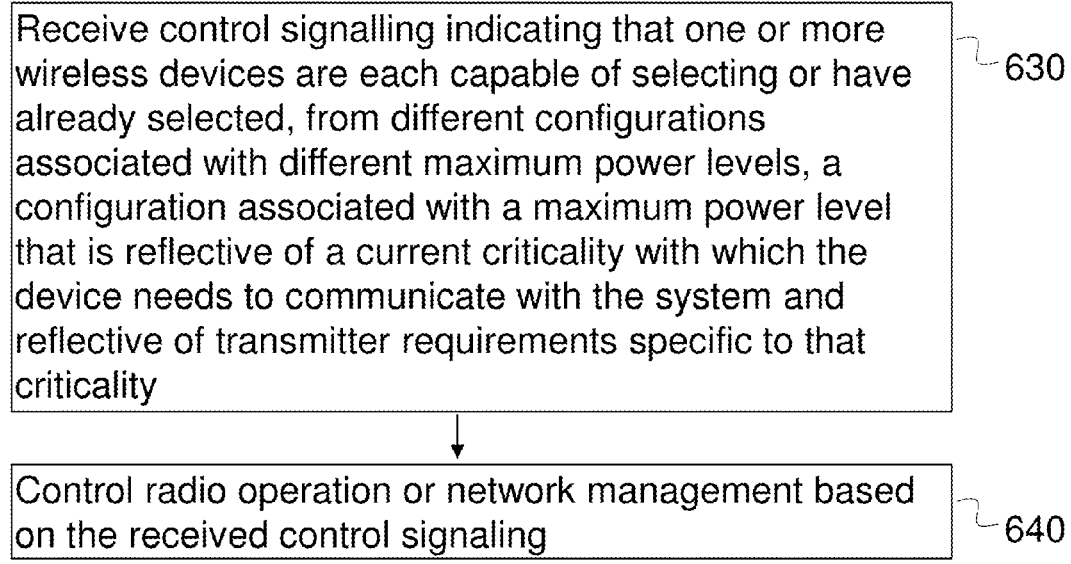

Still other embodiments herein focus on a network node controlling radio operation and/or network management based on the capability of one or more devices in the system to select a configuration, or based on actual application of such a configuration, as described above. FIG. 6b illustrates such processing.

As shown in FIG. 6b, processing at the network node entails receiving control signaling indicating that one or more wireless devices are each capable of selecting or have already selected, from different configurations associated with different maximum power levels, a configuration associated with a maximum power level that is reflective of a current criticality with which the device needs to communicate with the system and reflective of transmitter requirements specific to that criticality. This control signaling may be received from the wireless devices themselves, or from another network node. For instance, where the network node is a base station (NodeB or eNodeB) or base station controller (e.g., RNC), the network node may receive the control signaling from another base station or base station controller.

Regardless, processing at the network node further includes controlling radio operation or network management based on the received control signaling. Radio operation control may entail for instance controlling device admission to the system, controlling device handover between base stations in the system, controlling load balancing, and/or controlling the type of receiver with which base stations in the system receive communications from the devices, as described above.

FIG. 7a below depicts an exemplary wireless device 700 operative to perform the processing shown in FIG. 6a for controlling the total power with which the device transmit an uplink signal in a wireless communication system. As shown in FIG. 7a, the device 700 includes one or more interfaces 702 and one or more transmitter (TX) processing circuits 701. The device 700 may further include additional processing circuits not shown. The one or more interfaces 702 are configured to communicatively couple the wireless device to the wireless communication system, e.g., to one or more base stations via an air interface.

The one or more transmitter processing circuits 701 are configured to carry out the processing shown in FIG. 6a. The processing circuits 701 may functionally include a configuration selector 703 and a configuration application circuit 704. The configuration selector 703 is configured to select, from different defined configurations or modes associated with different maximum transmit power levels, a configuration associated with a maximum transmit power level that is reflective of a current criticality with which the device needs to communicate with the system and reflective of transmitter requirements specific to that criticality. The configuration application circuit 704 is configured to then apply the selected configuration for transmitting the uplink signal.

Those skilled in the art will of course appreciate that the above figure is simply an example, and that the depicted circuits may be realized, implemented, or otherwise configured within the node, based upon the execution of computer program instructions stored in memory or within another computer readable medium in the entity.

Similarly, FIG. 7b depicts an exemplary network node 750 operative to perform the processing shown in FIG. 6b for controlling radio operation and/or network management. As shown in FIG. 7b, the node 750 includes one or more interfaces 752 and one or more processing circuits 751. The node 750 may further include additional processing circuits not shown. The one or more interfaces 752 are configured to communicatively couple the network node 750 to the wireless communication system, e.g., to one or more other network nodes via a network interface and/or to one or more wireless devices via an air interface.

The one or more processing circuits 751 are configured to carry out the processing shown in FIG. 6b. The processing circuits 751 may functionally include a signaling circuit 753 and a controller 754. The signaling circuit 753 is configured to receive control signaling indicating that one or more wireless devices are each capable of selecting or have already selected, from different configurations associated with different maximum power levels, a configuration associated with a maximum power level that is reflective of a current criticality with which the device needs to communicate with the system and reflective of transmitter requirements specific to that criticality. The controller 754 is then configured to control radio operation or network management based on the received control signaling.

Again, those skilled in the art will of course appreciate that the above figure is simply an example, and that the depicted circuits may be realized, implemented, or otherwise configured within the node, based upon the execution of computer program instructions stored in memory or within another computer readable medium in the entity.

ABBREVIATIONS

3GPP 3rd Generation Partnership Project
ACLR Adjacent Channel Leakage Ratio
ACS Adjacent Channel Selectivity
A-MPR Additional MPR
BS Base Station
CA Carrier aggregation
CC Component Carrier
CLTD Closed Loop Transmit Diversity
CN Core Network
CoMP Coordinated Multiple Point Transmission and Reception
EDGE Enhanced Data rates for Global Evolution
EMF Electro Magnetic Field
eNodeB evolved NodeB
E-SMLC Evolved SMLC
E-UTRAN Evolved UTRAN
FDD Frequency Division Duplex
GERAN GSM EDGE Radio Access Network
GSM Global System for Mobile communications
HD-FDD Half Duplex-Frequency Division Duplex
HSDPA High speed downlink packet access
HSPA High speed packet access
LPP LTE positioning protocol
LPPa LTE positioning protocol annex
LTE Long-Term Evolution
MDT Minimization of drive test
MIMO Multiple Input Multiple Output
MMSE-IRC Minimum Mean Square Error Interference Rejection Combining
MOP Maximum output power
MPR Maximum power reduction
MSR Multi-standard radio
O&M Operation and Maintenance
OLBF Open Loop Beam-Forming
OOB Out of band
OSS Operational Support Systems
PA Power amplifier
P-MPR Power management MPR
PRACH Physical random access channel
PSBB Public Safety broadband
RA Random access
RACH Random access channel
RAT Radio Access Technology
RF Radio Frequency
RN Relay node
RNC Radio Network Controller
RRC Radio Resource Control
SAR Specific Absorption Rate
SEM Spectrum Emission Mask
SMLC Serving Mobile Location Center
SON Self Organizing Network
TDD Time Division Duplex
UE User Equipment
UMTS Universal Mobile Telecommunications System
UTRAN Universal Terrestrial Radio Access Network
WCDMA Wide band code division multiple access

What is claimed is:
1. A method, implemented by a wireless device in a wireless communication system, for adjusting a maximum output power level of the wireless device, the method comprising:

obtaining an indication indicating a current level of criticality in the system in which a network node serving the wireless device is operating; and adjusting the maximum output power level based on the current level of criticality indicated by the obtained indication.

2. The method of claim 1, further comprising transmitting a signal to the network node serving the wireless device at a transmit power equal to or below the adjusted maximum output power level.

3. The method of claim 2:

further comprising selecting at least one radio requirement depending on the current level of criticality indicated by the obtained indication;

wherein the signal is transmitted at a transmit power such that the selected at least one radio requirement is met.

4. The method of claim 1:

further comprising transmitting a capability indicating that the wireless device is capable of adjusting the maximum output power level based on level of criticality in the system;

wherein the capability is transmitted to the network node serving the wireless device.

5. The method of claim 1, wherein the adjusting the maximum output power level comprises:

selecting a configuration associated with the adjusted maximum output power level reflective of the indicated current level of criticality; and applying the selected configuration for transmission.

6. The method of claim 1, wherein the obtaining the indication indicating the current level of criticality comprises receiving the indication indicating the current level of criticality from the network node serving the wireless device.

7. The method of claim 6, wherein the indication indicating the current level of criticality is received in response to a request from the wireless device.

8. The method of claim 6, wherein the indication indicating the current level of criticality comprises at least one of:

an identifier of level of criticality, and an amount of power by which the maximum output power level is to be adjusted.

9. The method of claim 6:

wherein the indication indicating the current level of criticality comprises at least one of:

warning information related to an emergency situation; and a parameter controlling a radio emission of the wireless device;

wherein the obtaining the indication indicating the current level of criticality also comprises determining the current level of criticality based on the received indication.

10. The method of claim 1, wherein the obtaining the indication indicating the current level of criticality comprises receiving the indication indicating the current level of criticality from a subscriber user interface of the wireless device.

11. The method of claim 1, wherein the obtaining the indication comprises determining the current level of criticality based on at least one of:

measurements performed by the wireless device;

an ongoing call;

a geographical location of the wireless device;

a frequency used for transmission;

a time of the day; and a pre-defined rule mapping an operation scenario to level of criticality.

12. The method of claim 1, further comprising receiving a permission to adjust the maximum output power level, from the network node serving the wireless device, before adjusting the maximum output power level.

13. A method, implemented by a network node of a wireless communication system serving a wireless device, for enabling an adjustment of a maximum output power level of the wireless device based on a current level of criticality in the system, the method comprising:

transmitting an indication to the wireless device, the indication indicating the current level of criticality in the system;

wherein the level of criticality causes the maximum output power level of the wireless device to be adjusted.

14. The method of claim 13, further comprising receiving, from the wireless device, a capability indicating that the wireless device is capable of adjusting the maximum output power level based on a level of criticality in the system.

15. The method of claim 14, wherein the indication indicating the current level of criticality in the system is transmitted based on the received capability.

16. The method of claim 14, wherein the capability is received in response to a request from the network node.

17. The method of claim 14, further comprising performing radio operation tasks and/or network management tasks related to the wireless device based on the received capability.

18. The method of claim 17, wherein the radio operation tasks and/or network management tasks are performed based also on at least one of the following:

a type of the system in which the network node is operating;

the current level of criticality in the system;

a number of wireless devices served by the network node and having indicated a capability of adjusting their respective maximum output power level.

19. The method of claim 14, further comprising forwarding the received capability to another network node.

20. A wireless device configured to be used in a wireless communication system and to adjust a maximum output power level of the wireless device, the wireless device comprising:

an interface configured to communicatively couple the wireless device to the wireless communication system;

a processing circuit, wherein the processing circuit is configured to:

obtain an indication indicating a current level of criticality in the system in which a network node serving the wireless device is operating; and adjust the maximum output power level based on the current level of criticality indicated by the obtained indication.

21. The wireless device of claim 20, wherein the processing circuit is configured to transmit, via the interface, a signal to the network node serving the wireless device at a transmit power equal to or below the adjusted maximum output power level.

22. The wireless device of claim 21, wherein the processing circuit is configured to:

select at least one radio requirement based on the current level of criticality indicated by the obtained indication;

transmit the signal, via the interface, at a transmit power such that the selected at least one radio requirement is met.

23. The wireless device of claim 20:
wherein the processing circuit is configured to transmit, via the interface, a capability indicating that the wireless device is capable of adjusting the maximum output power level based on level of criticality in the system;
wherein the capability is transmitted to the network node serving the wireless device.

24. A network node of a wireless communication system configured to serve a wireless device and to enable an adjustment of a maximum output power level of the wireless device based on a current level of criticality in the system, the network node comprising:
an interface configured to communicatively couple the network node to the wireless device; and
a processing circuit configured to transmit, via the interface, an indication to the wireless device, the indication indicating the current level of criticality in the system;
wherein the level of criticality causes the maximum output power level of the wireless device to be adjusted.

25. The network node of claim 24, wherein the processing circuit is configured to receive, from the wireless device and via the interface, a capability indicating that the wireless device is capable of adjusting the maximum output power level based on a level of criticality in the system.

26. The network node of claim 25, wherein the processing circuit is configured to transmit, via the interface, the indication indicating the current level of criticality in the system based on the received capability.

* * * * *